Sept. 14, 1937.  E. J. FELDOTT  2,093,191
DEMOUNTABLE VEHICLE WHEEL
Original Filed Feb. 10, 1936  2 Sheets-Sheet 1
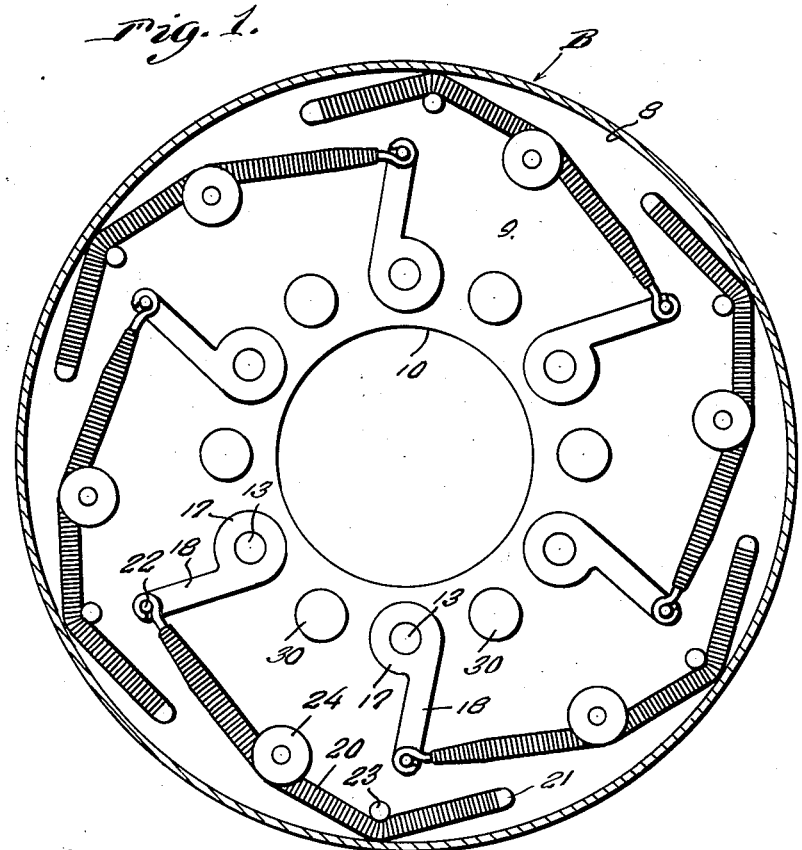
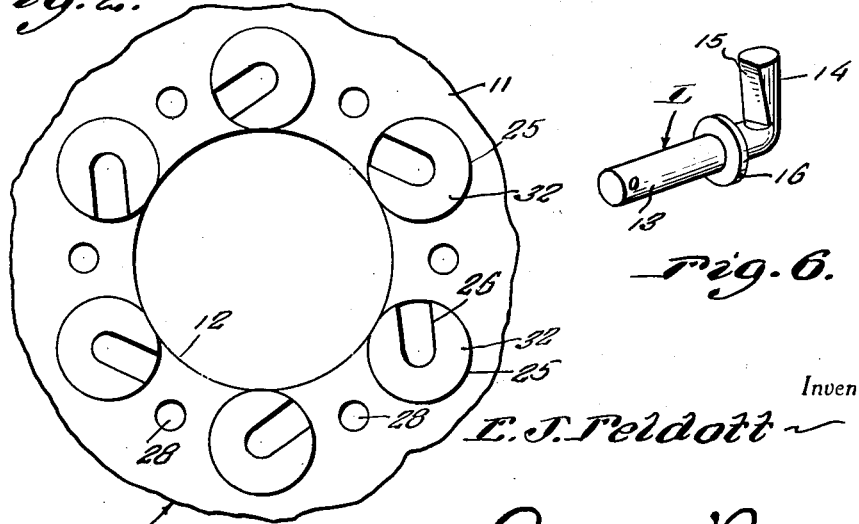
Inventor
E. J. Feldott
By Clarence A. O'Brien
Attorney Sept. 14, 1937. E. J. FELDOTT 2,093,191
DEMOUNTABLE VEHICLE WHEEL
Original Filed Feb. 10, 1936 2 Sheets-Sheet 2
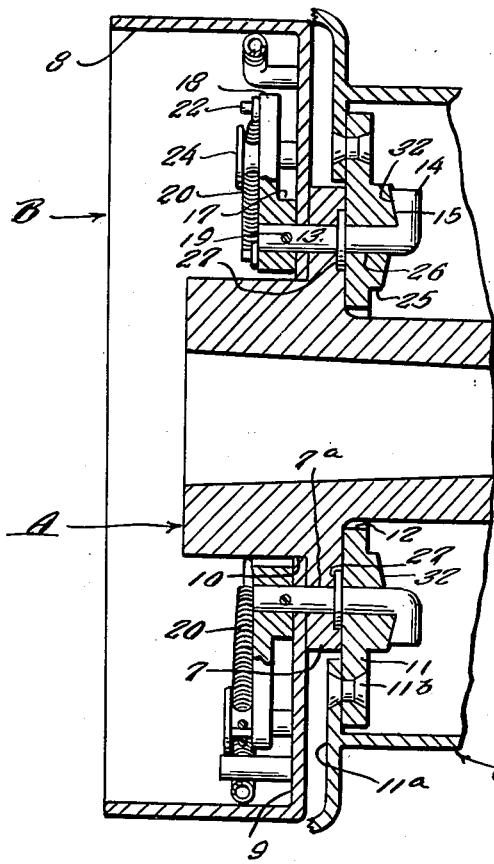
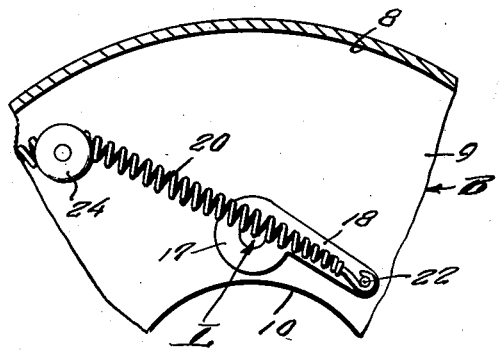
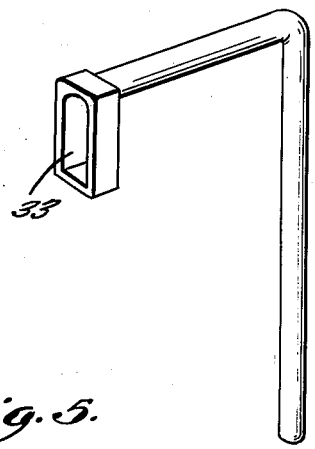
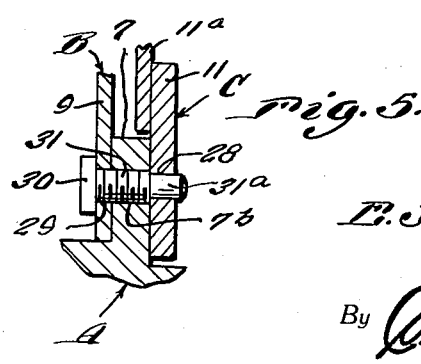
Inventor
E. J. Feldott
By Clarence A. O'Brien
Attorney Patented Sept. 14, 1937

2,093,191

UNITED STATES PATENT OFFICE 2,093,191

DEMOUNTABLE VEHICLE WHEEL

Edwin John Feldott, West Chicago, Ill.

Application February 10, 1936, Serial No. 63,239
Renewed March 20, 1937

4 Claims. (Cl. 301—9)

This invention relates to demountable automobile wheels.

One of the objects of the invention is to provide a construction in automobile wheels whereby the wheels may be changed with ease and dispatch.

Further objects of the invention are to provide a wheel assembly that is strong, compact and durable, thoroughly reliable and for its intended purpose, very easy and simple to manipulate, and comparatively inexpensive to manufacture.

With the foregoing and other objects in view, the invention consists of a novel construction, combination and arrangement of parts as will be hereinafter more specifically described and illustrated in the accompanying drawings wherein is disclosed an embodiment of the invention, but it is to be understood that changes, variations and modifications may be resorted to without departing from the spirit of the claims hereunto appended.

In the drawings wherein like reference characters denote corresponding parts throughout the several views:

Figure 1 is a radial section through the flange on a brake drum looking outwardly and with parts in locked relation.

Figure 2 is a fragmentary outside elevation of the demountable wheel removed from the drum and showing the arrangements of slots in the cam bosses.

Figure 3 is a fragmentary detailed axial section through the wheel assembly in accordance with the present invention showing the relation of the parts in locked position.

Figure 4 is a fragmentary view similar to Figure 1 showing the parts in unlocked relation.

Figure 5 is a fragmentary detailed radial section through the confronting faces of the drum and wheel in the area of one of the driving pins.

Figure 6 is a perspective view of one of the lock bolts.

Figure 7 is a fragmentary perspective view of the wrench used to release the lock bolts.

Referring to the drawings in detail, A indicates the usual hub structure of an automobile wheel formed with an outstanding shoulder 7 leaving flat side faces. In the front wheels this hub structure has a bearing connection with the spindle. In the rear wheel structure the hub is keyed to the axle to rotate therewith in order to drive the automobile.

Brake drum B is constructed with the customary peripheral brake flange 8 merging with the radial face 9 formed with a central opening 10 that fits over and is welded or otherwise secured to the hub A to rotate therewith. The automobile wheel C has a radial face 11a riveted as at 11b to a face plate 11 which latter is formed with a central opening 12 that encircles the hub A. In the assembled relation the face plate 11 of the wheel fits flush against the outside face of shoulder 7, while radial face 9 of the brake drum B fits flush against the flat inside face of shoulder 7.

There are a series of lock bolts L, one of which is shown in Figure 6 of the drawings, mounted to turn within certain limits in openings in the face 9 of the drum B and circumferentially spaced bores 7a in shoulder 7. These bolts L turn on axes parallel to that of the wheel and drum and are arranged in a circle circumferentially spaced from one another. Each lock bolt L is formed of a straight round shank 13 which merges on its outer end in a round integral latch finger 14 flattened on a bias on a segment 15 confronting the shank. Latch finger 14 extends at right angles to the shank and on an intermediate portion of the shank there is a radially projecting bearing collar 16.

The inner end of each shank 13 of each lock bolt projects inwardly of face 9 and is fixed in the bore of a hub 17 on the end of the lever 18 by means of a pin 19. There is one lever for each lock bolt and the hubs 17 bear against the face 9 of the drum. For supplying tension to each lever 18 one end of an elongated coil spring 20 is fixed to the face 9 as at 21 while the other end of the coil spring is hooked to a pin 22 on the inside of the lever 18 adjacent the outer end thereof. An intermediate portion of each coil spring 20 is trained over a pin 23 and a spool 24 secured to the inside of a face 9. There is one coil spring for each lever and these springs exert a tension on the levers.

On the outside of face plate 11 of wheel C are a series of round cam bosses 25 arranged in a circle concentric with the wheel and drum. The bosses are radially spaced at points coinciding with the spacing of the bores 7a in shoulder 7 and have radial slots 26 extending through the boss and face plate. The bore 7a merges with a counterbored recess 27 on the outside face of shoulder 7. The outer portion of the shank 13 and latch fingers 14 extend through the slots 26 and the bearing collars 16 turn in the recesses 27. Between the bosses, plate 11 has a series of smooth round apertures 28 arranged in a circle that register with a series of threaded apertures 29 in face 9 in the assembled relation. Shoulder 7 has a threaded aperture 7b registering with apertures 28, 29. The heads 30 of the driving pins bear on face 9 and the threaded shanks 31 engage the threaded openings 29 and 7b, and smooth ends 31a seat in openings 28 to form driving connections between the hub A, wheel C and the drum B. The outer face of cam bosses form cam faces 32 that have wiping engagement with the segments 15 on the latch fingers 14.

The slots 26 are arranged at an angle to the radius of plate 11 and are substantially equal to the radius of the cam bosses 25 extending from the centers to the peripheries of the bosses. The cam faces 32 beginning at one radial edge of the slots 26 and terminating at the opposite radial edge of the slots generate a spiral contour. The surface inclines uniformly in a radial direction from the periphery of the bosses to the centers thereof throughout the spiral contours which inclination coincides with the bias of segments 15 on the latch fingers. In locked relation the segments 15 bear against the cam faces 32 under the tension of the coil springs 20.

The tension on levers 18 that rock the bolts L is exerted from the spools 24 which are arranged off-center with respect to the axes of the lock bolts. When it is desired to remove the wheel C from the drum the latch fingers 14 are moved in a direction away from the cam faces 32 by a tool (as shown in Figure 7) having a socket 33 on one end which fits the fingers. When fingers 14 are in a position to register with the slots the levers have been moved from the locked position shown in Figure 1 to the unlocked position shown in Figure 4 and in the unlocked position the ends of levers 18 bear on hub A. In this position wheel C is lifted from the drum B by hand and the slots 26 pass over the latch fingers 14.

To replace the wheel, the spare wheel is positioned over the hub until the slots 26 register with the fingers 14 and openings 28 register with the reduced ends 31a on the drive pins. The wheel is then pushed inwardly and the fingers pass through slots 26 and the reduced ends 31a of the driving pins seat in the openings 28. In this position, the latch fingers are turned past the center and released whereupon the tension on the springs 20 cause the latch fingers 14 to ride up the cam faces 32 until the segments 15 are locked under tension against the higher portion of cam faces. In the locked position, the tension of the springs hold latch fingers tight against the cam faces and at the same time hold the latch fingers from turning to a position where they might register with the slots 26 which action overcomes the possibility of ever having the wheel become accidentally detached from the drum.

Having thus described the invention, what is claimed as new is:

1. The combination with a vehicle wheel of a hub, locking bolts rotatably mounted on the hub, a wheel carrying a radial plate formed with apertures adapted to receive the hub and one end of the locking bolts, tension means carried by the hub and connected with the other end of the locking bolts for turning the locking bolts on their axes, and cooperating means on said one end of the locking bolts and the radial plate to detachably lock the wheel to the hub.

2. The combination with a vehicle wheel of a hub, a brake drum carried by the hub and including a radially disposed portion, a series of angular locking bolts having one leg rockably mounted on the hub and having portions thereof projecting on the opposite sides of the radial portion of the drum, a wheel including a radially disposed plate formed with apertures to receive the hub and one end of the locking bolts, said radial plate formed with cam bosses cooperating with the other legs of the angular locking bolts, and spring means carried by the radial portion of the drum and connected with the end of said one leg of the locking bolts to retain the said leg locked against the cam bosses.

3. In a vehicle wheel assembly comprising a brake drum formed with a radial portion, a vehicle wheel formed with a radial plate, a series of slotted cam bosses arranged on one face of the wheel plate, a series of locking bolts having intermediate portions rockably mounted on the radial portion of the brake drum latch fingers on the one end of the locking bolts engageable with cam bosses in one position and registering with the slots in another position, and spring means carried by the radial portion of the brake drum and connected with the other end of the lock bolts to retain the latch fingers engaged with the cam bosses.

4. In a vehicle wheel assembly comprising a brake drum, spring tensioned lock bolts rockably mounted on the brake drum, a wheel having a plate, means for detachably securing the plate to the brake drum, said means including slotted cam bosses to receive and cooperate with the locking bolts.

EDWIN JOHN FELDOTT.